United States Patent [19]

Fukuda

[11] Patent Number: 5,239,325
[45] Date of Patent: Aug. 24, 1993

[54] SHUTTER HAVING OVERCHARGE RELEASE BUFFER

[75] Inventor: Tsuyoshi Fukuda, Kanagawa, Japan

[73] Assignee: Canon Kabushiki Kaisha, Tokyo, Japan

[21] Appl. No.: 650,478

[22] Filed: Feb. 5, 1991

[30] Foreign Application Priority Data

Feb. 7, 1990 [JP] Japan .................................. 2-027727

[51] Int. Cl.$^5$ ............................................... G03B 9/08
[52] U.S. Cl. ................................................ 354/234.1
[58] Field of Search ....................... 354/234.1, 246, 252

[56] References Cited

U.S. PATENT DOCUMENTS 4,129,877 12/1978 Yamamichi et al. .............. 354/271.1
4,355,878 10/1982 Ohniwa et al. .................... 354/234.1

Primary Examiner—Michael L. Gellner
Assistant Examiner—J. K. Han
Attorney, Agent, or Firm—Robin, Blecker, Daley & Driscoll

[57] ABSTRACT

A shutter comprises a shutter driving member arranged to be movably supported, an electromagnet which can be switched to an attracting state and an unattracting state, the electromagnet including a yoke and a coil, an armature arranged to move in a direction of going away from the yoke after being attracted by the yoke, so as to move the shutter driving member in the direction of shutter-running from a shutter-running preparatory position, a moving member for moving the shutter driving member toward the shutter-running preparatory position and holding the shutter moving member after further moving the shutter driving member from a position where the armature is brought into contact with the yoke by the movement of the shutter driving member, and a buffer member arranged to collide with a portion moving in a state where the armature is in contact with the yoke, when the holding of the shutter driving member by the moving member is released. The shutter is thus lightweight and small and has resistance to an impact.

11 Claims, 4 Drawing Sheets

SHUTTER HAVING OVERCHARGE RELEASE BUFFER

BACKGROUND OF THE INVENTION

Field of the Invention

This invention relates to a shutter used in optical instruments such as a camera and the like.

Description of the Related Art

In conventional shutters which have been used in optical instruments, an armature is provided on a shutter curtain driving member so that, when the shutter curtain driving member is charged by a charge member, the armature is attracted to the yoke of an electromagnet, and the shutter curtain driving member is maintained in a state where it is charged by the charge member to an extent higher than a level required for bringing the armature into contact with the yoke (overcharge state) until a shutter release signal is sent out. In order to prevent such overcharge from damaging the shutter mechanism, it is necessary to provide an energy absorbing mechanism.

Examples of conventional shutters of the above-described type provided with such an energy absorbing mechanism include the following shutters:

(1) a shutter comprising a movable yoke and an additional spring for returning the movable yoke to a predetermined position when the overcharge state is released; and (2) a shutter comprising an additional spring interposed between an armature and a shutter curtain driving member so that the spring is compressed during overcharge, and the armature is returned to a predetermined position by virtue of the spring when the overcharge is released.

In a camera including this type of shutter, when a release signal is sent out, an electromagnet is first energized, and a charge member is then retracted from the overcharge state to a position where the charge member does not obstruct the running of a shutter curtain driving lever. At the same time, since the electromagnet is energized, the magnet attracts and holds the armature provided on the driving lever and maintains the driving lever in a state before running against the force of the driving spring which acts on the driving lever. In the camera, the energizing of the electromagnet which attracts the armature of each of a leading curtain driving lever and a trailing curtain driving lever is then cut off so that running of each of the driving levers is started by virtue of the driving spring.

In the conventional shutter having the above-described structure and operating form, when the driving lever is released from the overcharge state before the energizing of the electromagnet is cut off, the driving lever is rotated by virtue of the driving spring in an amount corresponding to the amount of energy absorbed by the energy absorbing mechanism (i.e., the additional spring), and the electromagnet attracts the armature provided on the driving lever when the driving lever is returned for a distance corresponding to the absorbed energy, whereby the rotation of the driving lever is stopped. When the rotation of the driving lever is stopped, a great impulsive force acts on the driving lever to generate a large force of separating the armature from the electromagnet.

In this case, the troubles described below therefore occur. If the attraction of the armature of the leading curtain driving lever by the electromagnet cannot be maintained, a photograph is taken in an overexposure state. On the other hand, if the attraction of the armature of the trailing curtain driving lever by the electromagnet cannot be maintained, a photograph is taken in a non-exposure state.

In the conventional shutter having the above-described energy absorbing mechanism, therefore, the attractive force of the electromagnet must be sufficiently strong to prevent the occurrence of the above problems even if the above-described impulsive force acts on the driving lever. The conventional shutter thus has the problem that the size and weight thereof are increased.

In addition, since the force of the spring for driving the driving lever must be decreased for decreasing the impulsive force, the speed of the shutter curtain is inevitably decreased. As a result, it is impossible to realize a high speed shutter by using this type of shutter.

SUMMARY OF THE INVENTION

It is an object of the present invention to provide a light and small shutter which has resistance to an impact and which comprises a buffer member for absorbing impact interposed between an armature holding member and a shutter driving member or between a yoke and a coil for the purpose of absorbing an impulsive force.

DETAILED DESCRIPTION OF THE PREFERRED EMBODIMENTS

Embodiments of this invention are described below with reference to the attached drawings.

Figure 1:
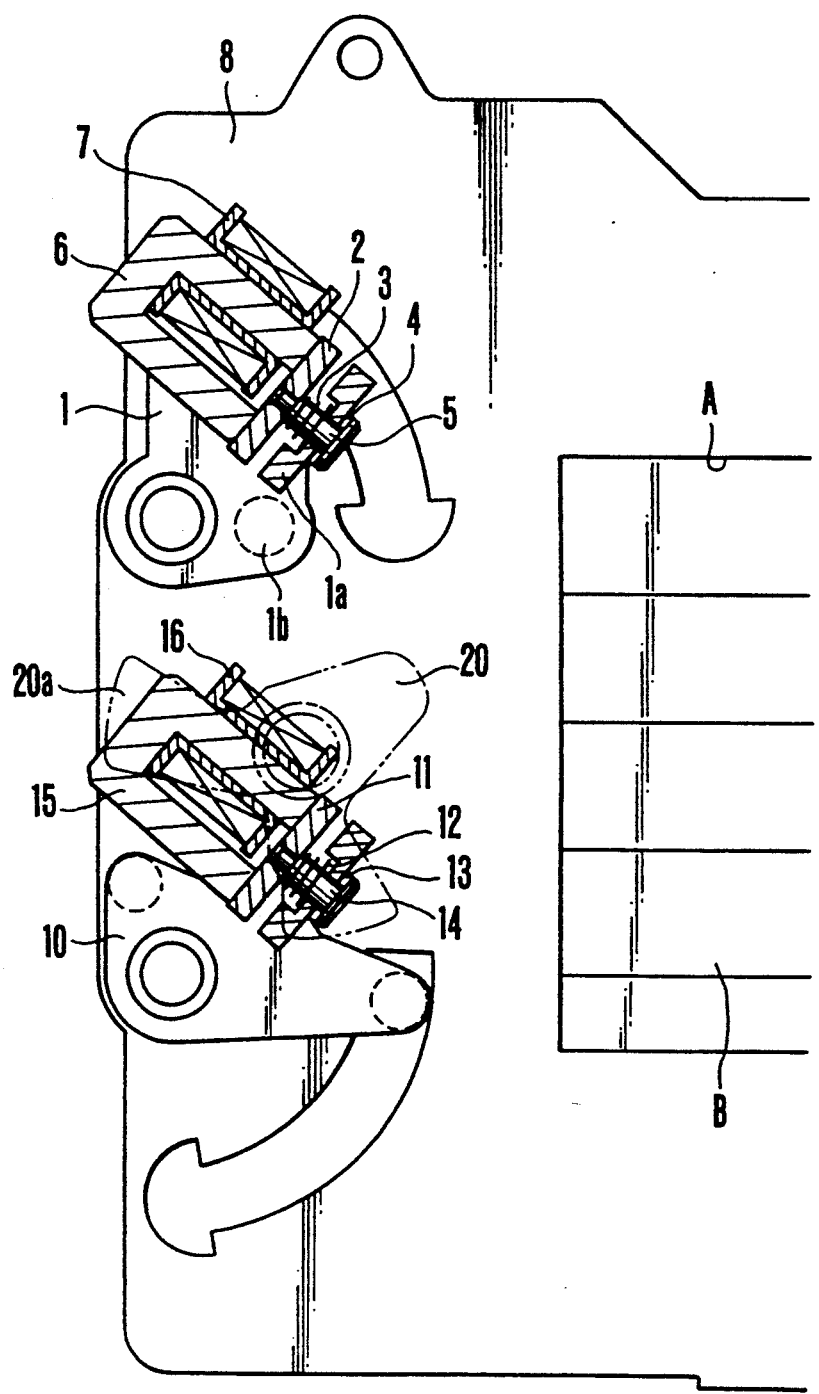
FIG. 1 is a front view of a principal portion of a shutter in accordance with a first embodiment of this invention.

FIG. 1 is a front view of a portion around a driving portion of a shutter according to a first embodiment. In FIG. 1, reference numeral 1 denotes a trailing curtain driving lever (shutter driving member) for driving a shutter trailing curtain (not shown), with the lever 1 being urged by a driving spring (not shown) in the direction of right-handed rotation. Reference numeral 2 denotes an armature which is made of a magnetic material and which is fixed to an armature mounting portion 1a of the trailing curtain driving lever 1 together with a spring 3 by using a shaft 5. Portion 1a functions as an armature operating member.

Reference numeral 3 denotes the spring for absorbing energy when the trailing curtain driving lever 1 is overcharged, and reference numeral 4 denotes a buffer member (shock absorbing member) which is made of rubber or the like and which is interposed between a flange 5a (FIG. 2) of the armature shaft 5 and the armature mounting portion 1a of the trailing curtain driving lever 1. Reference numeral 6 denotes a yoke which is a component of a first electromagnet; reference numeral 7, a coil which is also a component of the first electromagnet; and reference numeral 8, a shutter base plate to which the yoke 6 and the coil 7 are fixed and on which other parts are mounted. Reference numeral 10 denotes a leading curtain driving lever for driving a leading blade group B serving as a shutter leading curtain, with the driving lever 10 being urged by a driving spring (not shown) in the direction of right-handed rotation. Reference numeral 11 denotes an armature made of a magnetic material; reference numeral 12, a spring for absorbing energy corresponding to overcharge when the leading curtain driving lever 10 is overcharged; reference numeral 13, a buffer member; and reference numeral 14, an armature shaft. Reference numeral 15 denotes a yoke which is a component of a second electromagnet; reference numeral 16, a coil which is also a component of the second electromagnet; and reference numeral 20, a charge lever. Character A denotes an aperture serving as an exposure opening, and character B denotes the blade group serving as the shutter leading curtain.

Figure 2:
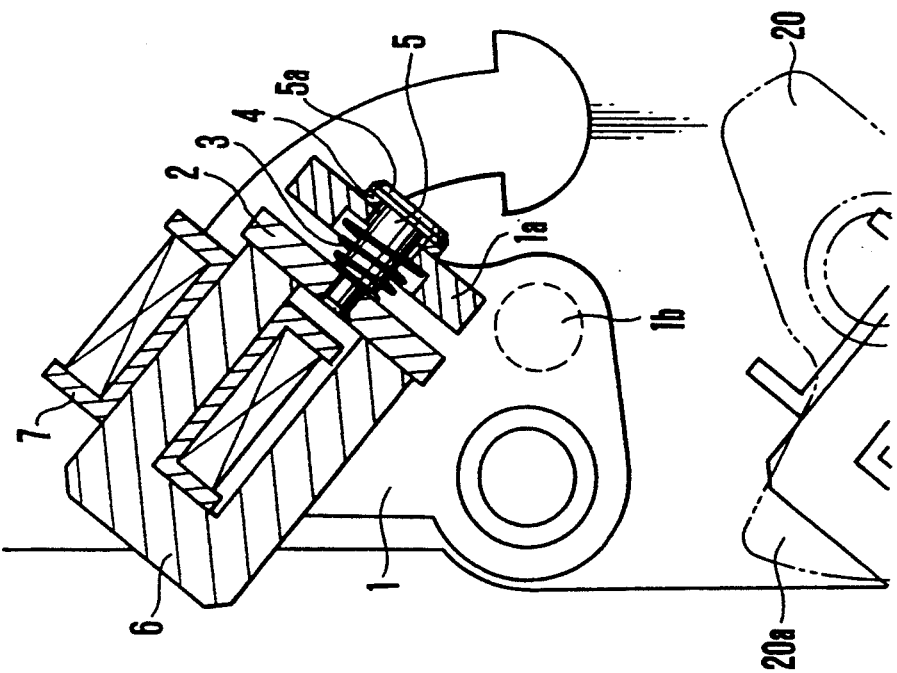
FIGS. 2 and 3 are respectively enlarged views showing a state where the shutter shown in FIG. 1 is operated.
Figure 3:
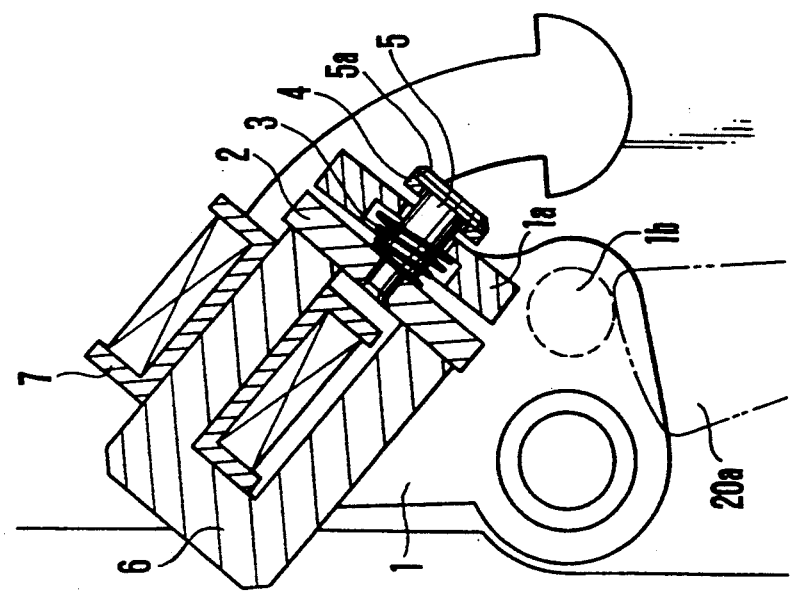

FIG. 2 is an enlarged view showing the state where the trailing curtain driving lever 1 is overcharged by the charge lever 20. FIG. 3 shows the state where the overcharge state is released, the coil 7 is energized, and an energizing OFF signal (trailing curtain running start signal) is waited for.

The operation of the shutter will be described below. Because both the leading curtain driving lever 10 and the trailing curtain driving lever 1 basically perform the same operation, only the operation of the trailing curtain driving lever 1 is described below.

When the exposure of a film is completed during photography, the charge lever 20 is rotated in the right-hand direction (in the clockwise direction) in linkage with the operation of winding the film. Since the shaft 1b of the trailing curtain driving lever 1 is upwardly pushed by the leg 20a of the charge lever 20, the trailing curtain driving lever 1 is rotated in the left-hand direction. Although the armature 2 comes into contact with the yoke 6 at the end of the charge of the trailing curtain driving lever 1, the charge lever 20 is further rotated in the right-hand direction, and the trailing curtain driving lever 1 is further rotated in the left-hand direction by a predetermined measure. As a result, an overcharge state is produced. At this time, the armature 2 is not further moved, and the armature 2, the shaft 5 and the buffer member 4 remain stopped at a position. However, because the armature mounting portion la of the trailing curtain driving lever 1 is rotated in the left-hand direction, the spring 3 is pushed and compressed by the armature mounting portion la of the trailing curtain driving lever 1. As a result, the state shown in FIG. 2 in which a charge is completed, is brought about. In this state, the charge lever 20, which has thus functioned as a moving member for moving the shutter driving member, is held at a position, and the driving lever 1 is also held in this state.

In the state shown in FIG. 2, the shutter waits for a release signal, and, when the release signal is then sent out, the coil 7 is energized so that the yoke 6 attracts the armature 2. The holding of the charge lever 20 is then released so that the charge lever 20 is rotated in the left-hand direction and returned to the initial position. At the same time, the trailing curtain driving lever 1 in the overcharge state is released from engagement with the charge lever 20 and rotated in the right-hand direction by the driving spring (not shown).

However, when the right-hand rotation of the lever 1 is started from the position shown in FIG. 2, the buffer member 4 immediately comes into contact with the armature mounting member 1a of the trailing curtain driving lever 1, and since the armature 2 is attracted to the yoke 6, the right-handed rotation of the lever 1 is stopped. During this time, a great impulsive force is generated by the inertia force so as to separate the armature 2 from the yoke 6. It would have been, therefore, necessary to increase the attractive force of the electromagnet by increasing the sizes of the coil, the yoke and so forth.

In addition, in order to decrease the impulsive force, it would have been necessary to keep the highest shutter speed at a low level. However, in this embodiment, the impulsive force is significantly decreased by providing the buffer member 4. This embodiment thus permits a significant decrease in the sizes of the coil 7, the yoke 6 and the armature 2 of a shutter having the same driving force, i.e., the same highest shutter speed, as that of a conventional shutter. Conversely, the use of a shutter comprising the coil 7, the yoke 6 and the armature 2 each having the same size of that in a conventional shutter permits a significant increase in the shutter speed. If the buffer member 4 is fixed to the armature mounting portion 1a so that the flange 5a of the shaft 5 comes into contact with the buffer member 4 when the overcharge caused by the charge lever 20 is released, the same effect as that described above is obtained.

A second embodiment of this invention will be described below with reference to FIGS. 4 to 6.

Figure 4:
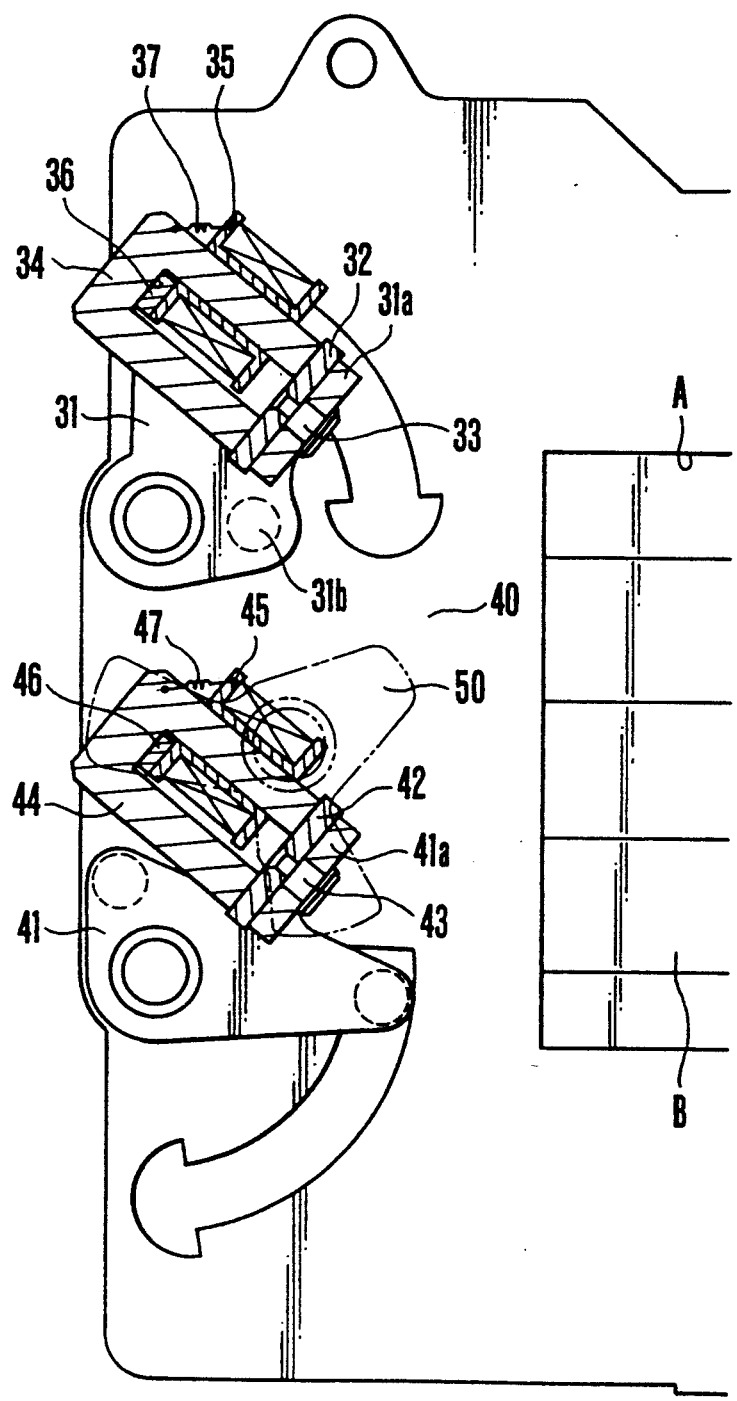
FIG. 4 is a front view of a principal portion of a shutter in accordance with a second embodiment of this invention.

FIG. 4 is a front view of a portion around the driving portion of a shutter in accordance with the second embodiment. In the drawing, reference numeral 31 denotes a trailing curtain driving lever which engages with a trailing curtain for the purpose of driving it, with the driving lever 31 being urged in the direction of right-handed rotation by a driving spring (not shown). Reference numeral 32 denotes an armature which is made of a magnetic material and which is fixed to an armature mounting portion 31a of the trailing curtain driving lever 31 by using a shaft 33. Reference numeral 34 denotes a yoke which is made of a magnetic material and which generates a magnetic force of attracting the armature 32 when a coil 35 is energized. Reference numeral 36 denotes a buffer member which is made of rubber or the like and which is mounted on the yoke 34 and positioned between the yoke 34 and the coil 35. Reference numeral 37 denotes a spring for pressing the yoke 34 against the coil 35, and reference numeral 40 denotes a base plate on which parts of the shutter are mounted.

Reference numeral 41 denotes a leading curtain driving lever which engages with a leading curtain (not shown) for the purpose of driving it and which is urged in the direction of right-handed rotation by a driving spring (not shown).

Reference numeral 42 denotes an armature made of a magnetic material; reference numeral 43, an armature shaft; reference numeral 44, a yoke which constitutes an electromagnet; reference numeral 45, a coil which also constitutes the electromagnet; reference numeral 46, a buffer member; and reference numeral 47, a spring for pushing the yoke 44 against the coil 45.

Figure 5:
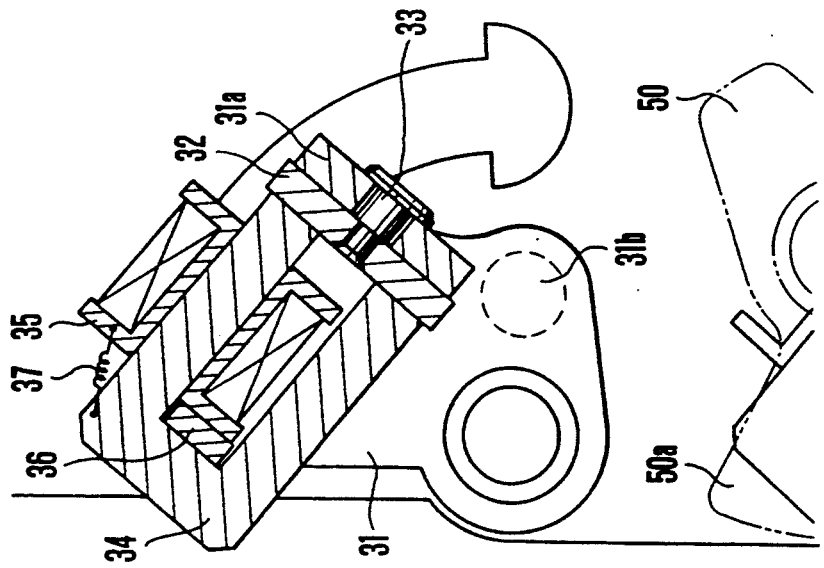
FIGS. 5 and 6 are respectively explanatory views showing the operation of the shutter shown in FIG. 4.
Figure 6:
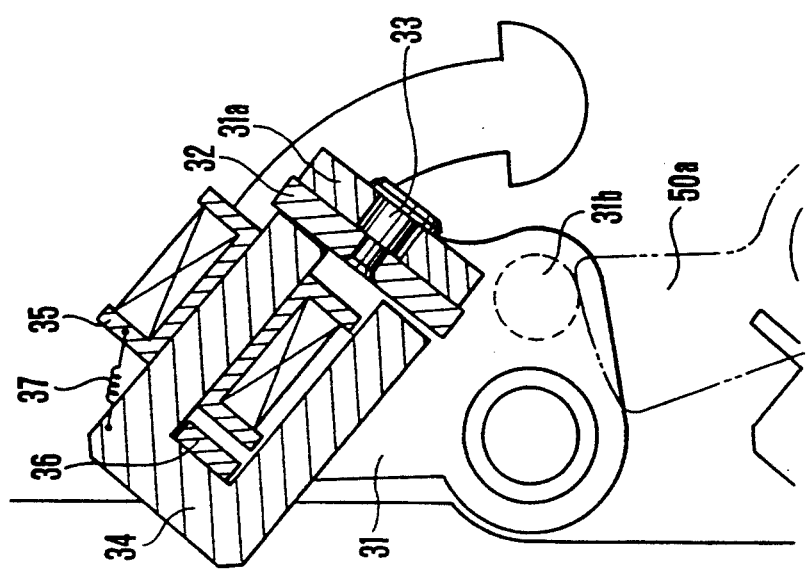

FIGS. 5 and 6 are enlarged views of the portion around the trailing curtain driving lever 31 shown in FIG. 4. FIG. 5 shows the state where the trailing curtain driving lever 31 is overcharged by a charge lever 50.

FIG. 6 shows the state where the overcharge state is released, the coil 35 is energized, and an energizing OFF signal (trailing curtain running start signal) is waited for.

The operation of the shutter will be described below. Because both the leading curtain driving lever 41 and the trailing curtain driving lever 31 basically perform the same operation, the operation of only the trailing curtain driving lever 31 is described below.

When exposure of a film is completed during photography, since the charge lever 50 is rotated in the right-hand direction in linkage with the operation of winding the film, the shaft 31b of the trailing curtain driving lever 31 is upwardly pushed by the leg 50a of the charge lever 50 so that the trailing curtain driving lever 31 is rotated in the left-handed direction. Although the armature 32 comes into contact with the yoke 34 substantially at the end of the charge of the trailing curtain driving lever 31, the charge lever 50 is further rotated in the right-hand direction, and the trailing curtain driving lever 31 is also further rotated in the left-handed direction by a predetermined means. As a result, the shutter assumes a so-called overcharge state (FIG. 5) where the yoke 34 is pushed in by the armature 32. In this state, the yoke 34 is urged by virtue of the spring 37 in the direction of contact with the armature 32. The shutter waits for a release signal in the state shown in FIG. 5.

When a release signal is sent out, the coil 35 is energized, and the yoke 34 generates the magnetic force of attracting the armature 32. The holding of the charge lever 50 in the state shown in FIG. 5 is thus released so that the charge lever 50 is rotated in the left-hand direction and returned to the initial position. At the same time, the trailing curtain driving lever 31 in the overcharge state is released from engagement with the charge lever 50 and rotated in the right-hand direction by a driving spring (not shown). However, when the trailing curtain driving lever 31 is slightly rotated in the right-hand direction from the position shown in FIG. 5, since the buffer member 36 held by the yoke 34 comes into contact with the coil 35, the right-handed rotation of the trailing curtain driving lever 31 is also stopped at the position. During this time, an impulsive force of separating the armature from the yoke acts between the armature 32 and the yoke 34 by the inertia force of the driving lever 31 and the force of the driving spring. It would have been therefore, necessary to employ a design method in which the attractive force is increased by increasing the sizes of the coil 35, the yoke 34 and so on or a design method in which the shutter speed of a shutter is decreased by decreasing the driving force in order to decrease the impulsive force as much as possible.

However, this embodiment permits a significant decrease in the impulsive force by providing the buffer member 36 between the yoke 34 and the coil 35. When a shutter having the same driving force (i.e., the same highest shutter speed) as that of a conventional shutter is manufactured, the sizes of the coil 35, the yoke 34 and the armature 32 can be significantly decreased. If the buffer member 36 is fixed to the coil 35 so that the yoke 34 collides with the buffer member 36, the same effect can be obtained.

Conversely, if the coil 35, the yoke 34 and the armature 32 each having the same size of that in a conventional shutter are used in the shutter of this invention, the driving force, i.e., the highest speed, can be significantly increased, as compared with a conventional shutter.

As described above, in a shutter of each of the above embodiments, the buffer member for absorbing impact is provided between the yoke and the coil or between the armature and the armature holding member in order to hold the state where the armature held by the shutter curtain driving member or the like is attracted to the yoke of the electromagnet. It is, therefore, possible to solve the problem which is inherent in conventional shutters. This invention is capable of realizing a light and small shutter which consumes very little electricity, as compared with a conventional shutter, or a higher-speed shutter and which has the same size as that of a conventional shutter.

What is claimed is:

1. A shutter comprising:
   (a) a shutter driving member arranged to be movably supported;
   (b) an armature operating member having a fixed relation to said shutter driving member;
   (c) an armature arranged to be moved by said armature operating member, said armature being slightly movable relative to said armature operating member, said armature including an armature shaft;
   (d) an electromagnet which can be switched to a state for attracting said armature and a state not attracting said armature, said electromagnet including a yoke and a coil;
   (e) a moving member for moving said shutter driving member to a shutter-running preparatory position, said shutter driving member being moved by said moving member until a relative position between said armature and said armature operating member is changed by moving said shutter driving member by a predetermined measure beyond a state where said armature comes into contact with said yoke; and
   (f) a buffer member arranged to come into contact with one of said armature and said armature operating member when said armature operating member is moved by said predetermined measure as said moving member returns to its initial state.

2. A shutter according to claim 1, wherein a spring is interposed between said armature and said armature operating member so as to urge said armature in a direction of going away from or coming near to said armature operating member.

3. A shutter according to claim 2, wherein a shaft is fixed to said armature and inserted into said armature operating member, and said buffer member is fixed to a flange portion of said shaft, so that said armature operating member collides with said buffer member when the movement of said shutter driving member to the shutter-running preparatory position by said moving member is released.

4. A shutter according to claim 1, wherein an attractive force is generated in said yoke of said electromagnet when said coil thereof is energized.

5. A shutter according to claim 1, wherein said buffer member is made of a rubber material.

6. A shutter comprising:
   (a) a shutter driving member arranged to be movably supported;
   (b) an armature operating member having a fixed relation to said shutter driving member;

(c) an armature arranged to be moved by said armature operating member;

(d) an electromagnet which can be switched to a state for attracting said armature and a state not attracting said armature, said electromagnet including a yoke and a coil, said yoke being movable relative to said coil;

(e) a moving member for moving said shutter driving member to a shutter-running preparatory position, said shutter driving member being moved by said moving member until said yoke is also moved by further moving said shutter driving member by a predetermined measure beyond a state where said armature comes into contact with said yoke; and (f) a buffer member arranged to come into contact with one of said yoke and said coil when said armature operating member is moved by said predetermined measure as said moving member returns to its initial state.

7. A shutter according to claim 6, wherein a spring member is interposed between said yoke and said coil so as to urge said coil in a direction of going away from or coming near to said yoke.

8. A shutter according to claim 6, wherein an attractive force is generated in said yoke of said electromagnet when said coil thereof is energized.

9. A shutter according to claim 6, wherein said buffer member is made of a rubber material.

10. A shutter comprising:

(a) a shutter driving member arranged to be movably supported;

(b) an electromagnet which can be switched to an attracting state and non-attracting state, said electromagnet including a yoke and a coil;

(c) an armature arranged to move in a direction of going away from said yoke after being attracted by said yoke, so as to move said shutter driving member in the direction of shutter-running from a shutter-running preparatory position;

(d) moving means for moving said shutter driving member toward the shutter-running preparatory position, said moving means holding said shutter driving member after further moving said shutter driving member beyond a position where said armature is brought into contact with said yoke by the movement of said shutter driving member; and (e) a buffer member arranged to collide with one of said yoke and said coil when the holding of said shutter driving member by said moving means is released.

11. A shutter according to claim 10, wherein said buffer member is made of a rubber material.

* * * * *